Sept. 15, 1931.                A. I. SHAKHNAZAROV                    1,823,336
                DEVICE FOR MEASURING DEVIATIONS OF DRILLED WELLS
                                Filed July 8, 1929
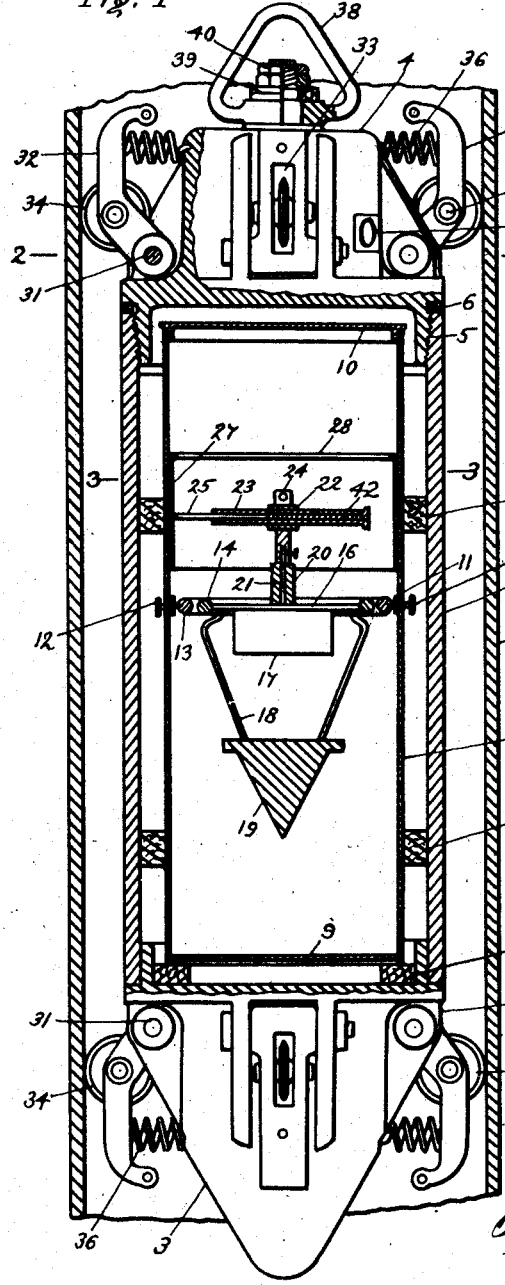
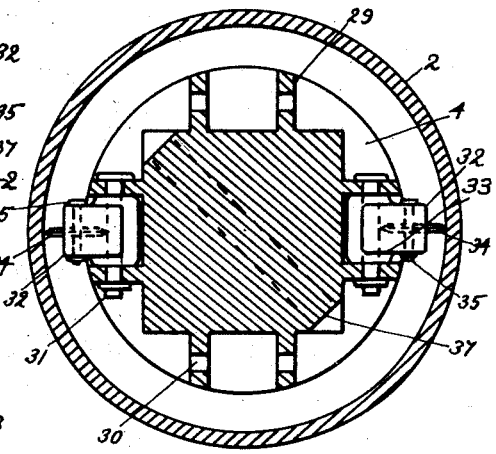
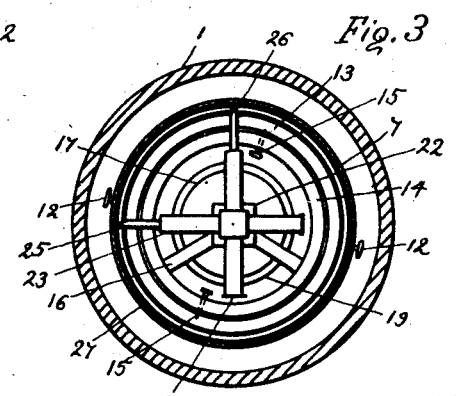
ARMENAK I. SHAKHNAZAROV
INVENTOR
BY *John P. Nixonow*
ATTORNEY Patented Sept. 15, 1931

1,823,336

UNITED STATES PATENT OFFICE

ARMENAK I. SHAKHNAZAROV, OF BAKU, UNION OF SOCIALIST SOVIET REPUBLICS

DEVICE FOR MEASURING DEVIATIONS OF DRILLED WELLS

Application filed July 8, 1929. Serial No. 376,766.

My invention relates to apparatus for measuring deviations of drilled wells and has a particular reference to apparatus adapted to be lowered into a casing pipe of well and provided with a recording attachment.

The object of my invention is to provide a portable device which can be lowered in a casing pipe of a well and which will automatically draw a diagram indicating deviations of the well from the true vertical line.

For this purpose I use an enclosed metal cylinder adapted to be lowered into the well and provided with a clock mechanism operating drawing instruments which continuously inscribe spiral lines on a sheet of paper. This clock mechanism is actuated by a pendulum which tends to retain vertical position even when the cylinder becomes inclined. Therefore in an inclined or curved well the curves drawn on paper by the clock mechanism will not be true spirals but will deviate, and the amount of such deviation will determine the actual deviation of the well.

My invention is more fully described in the accompanying specification and drawings in which—

Fig. 1 is a sectional elevation of my apparatus, Fig. 2 is a section taken on the line 2—2, Fig. 1, Fig. 3 is another section taken on the line 3—3, Fig. 1, and Fig. 4 is a sectional view of the clock.

My device consists of a steel tube (1) of a smaller diameter than the casing pipe (2) of the well. A metal block (3) is fitted to the lower end of the pipe (1) and is welded or braced to it. This block has a conical end in order to facilitate its lowering and raising in an oil well.

A cover block (4) is fitted into the upper end of the tube (1) on a tapering thread (5) with sealing gasket (6) made of leather or rubber. The tube (1) when fully assembled, is designed to resist external pressure up to 1500 lbs. per square inch and over as such pressures may be encountered in the oil wells.

A second or inner cylinder (7) is placed inside of the cylinder (1) and is separated therefrom by blocks or ring spacers (8) made of cork, rubber or similar resilient material, in order to lessen the jars or shocks transmitted from the outside of the apparatus to the inner mechanism. The cylinder (7) has a bottom plate (9) and a cover (10). It is made of a sheet metal or other suitable material.

A reinforcing strip (11) is attached to the wall of the cylinder (7) approximately in the middle of it and is provided with threaded holes directly opposite each other (on the same diameter) for screws (12). These screws have sharp pointed ends forming pivots for a metal ring (13). A second smaller ring (14) is placed inside of the ring (13) and is supported on trunnions formed by the ends of screws (15) fitting in corresponding holes in the ring (13).

The inner ring (14) has plates (16) inside of which a clock mechanism (17) is attached, also downward extending arms (18) supporting a heavy weight (19). This weight represents a pendulum which, being supported on gimbal rings (13 and 14), is free to swing in any direction. In other words, it can remain suspended with its axis on a true vertical line even when the housing (1) is inclined.

A post (20) is attached to the plate (16) and supports a shaft (21) which can rotate and slide up and down. This shaft is operated by the clock mechanism (17) by being rotated and moved vertically at a uniform rate of speed, for instance, one revolution per hour.

A block or cross piece (22) is attached to the upper end of the shaft (21) and is adapted to support pencil holders (23 and 24) located at right angles with each other.

These pencil supports represent tubes in which can slide pencils (25 and 26). These pencils are pressed by springs (42) against the surface of paper or similar material (27). This paper is made in the form of a tube, fitting inside of the chamber (7) with a resilient clamping ring (28).

The end blocks (3 and 4) have lugs (29) on the sides with holes (30) for pins (31) supporting swinging arms (32). Those arms have slots (33) for steel wheels (34) with sharp edges rotatively mounted on pins (35). Compression springs (36) tend to move the arms with the wheels (34) away from the blocks (3 and 4), thereby pressing the wheels against the walls of a casing pipe (2).

A hole (37) is provided in the top block (4) which is used for inserting an iron bar for screwing the block into the pipe (1) and for unscrewing it again when required. The clock mechanism is shown separately in Fig. 4. It consists of a train of gears 38 connected with a spring mechanism 39 and driving a shaft 40 with a pinion 41 in mesh with a long gear 42 on the shaft 21. This shaft is threaded in its lower portion and can turn in a stationary nut 43, so that when the shaft 21 is rotated by the clock gears, it is also moved axially.

The operation of my device is as follows:
The top block (4) is unscrewed, the cap (10) removed, and the clock (17) is wound. The upper pencil is placed in the middle of the paper (27), and the lower pencil, below. The clock is released and the exact time noted, when the pencils begin to describe curves on the paper.

The cover (10) is then replaced and the block (4) screwed on. The swivel (38) is hooked on a steel cable, chain or similar flexible carrier, and the apparatus is inserted into the upper end of the oil well. It is then gradually lowered into the casing at a constant rate of movement, preferably by means of a constant speed motor with a suitable transmission. The exact time when the lowering begins is also noted, as is noted the rate of speed of the lowering of the apparatus.

The sharp edges of the wheels (34), while facilitating the sliding of the device in the pipe, prevent same from turning sideways. The swivel (38) is provided with a thrust ball bearing (39) with which it rests against nuts (40), so that it turns freely if the cable has a tendency to become twisted, but this turning is not transmitted to the apparatus itself. It is also possible to remove the swivel (38) and to attach the device to a rigid pipe or a bar.

When the apparatus reaches a certain point in the well, the curvature of which it is desired to measure, it is left in that place for about fifteen minutes for taking a diagram of the curvature of the well, then the apparatus is removed.

The time is noted when the apparatus reaches the bottom of the well and it is then pulled out. It may be removed quickly without regard for the time element, or it may be moved up also at a constant rate of speed, in which case the second half of the curves drawn by the pencils will serve as a check on the first part of the curve.

It is evident that if the well is strictly vertical, then both pencils will draw true circles. Any deviations from the vertical line will cause the apparatus to move at an angle with the vertical line. The pendulum (19) will retain, however, the vertical direction of its axis, which then will no longer be coaxial with the tube (1) and the pencils (25 and 26) which accordingly remain in a horizontal position, will be shifted from the true spiral curves. The time of starting, stopping and lifting of the device is known, then the angle of deflection of the measured portion of the well can be easily determined by applying a scale or templet to the curve.

The apparatus as shown in Figure 1 is constructed for a maximum of 20 degrees deviation both ways, although it may be easily built for a maximum up to 45 degrees.

If the time is known when the clock was started and when it was stopped, also the time when the apparatus entered the well and when it reached the bottom, then these points can be easily plotted on the curves thereby separating the portion of the curve which belongs to the actual travel of the apparatus in the well.

Important advantages of this apparatus are that it is portable and simple in operation, can be used with the already existing equipment at the oil wells, also that it furnishes permanent records for each well tested.

I claim as my invention:

1. In a device for measuring deviations of drilled wells, the combination with a tubular chamber, of an inner chamber inside of said first chamber, a pendulum in said inner chamber, a universal suspension for said pendulum, a tubular member on said pendulum at right angle with its axis, a writing implement slidably fitted in said tubular member, means to press said writing implement against the inner wall of said inner chamber, means to support a sheet of paper on said inner wall, a clock mechanism supported by said pendulum, said clock being adapted to move said tubular member in a vertical direction, and means to guide said first chamber in a well.

2. In a device for measuring deviations of drilled wells, the combination with a chamber, of a pendulum in said chamber, a universal suspension for said pendulum on gimbal rings, means to support a paper on the inside wall of said chamber, a writing implement supported on said pendulum, means to press said implement against said paper for all positions of said pendulum, a clock mechanism on said pendulum adapted to move said writing implement in a vertical direction, and means to guide said chamber in a well.

In testimony whereof I affix my signature.

ARMENAK I. SHAKHNAZAROV.